(12) United States Patent
Russikoff

(10) Patent No.: US 11,788,610 B2
(45) Date of Patent: Oct. 17, 2023

(54) DRIVE MECHANISM FOR TELESCOPIC LINEAR ACTUATOR

(71) Applicant: LIPPERT COMPONENTS MANUFACTURING, INC., Elkhart, IN (US)

(72) Inventor: Ronald K. Russikoff, Philadelphia, PA (US)

(73) Assignee: LIPPERT COMPONENTS MANUFACTURING, INC., Elkhart, IN (US)

( * ) Notice: Subject to any disclaimer, the term of this patent is extended or adjusted under 35 U.S.C. 154(b) by 183 days.

(21) Appl. No.: 17/500,084

(22) Filed: Oct. 13, 2021

(65) Prior Publication Data

US 2022/0034388 A1 Feb. 3, 2022

Related U.S. Application Data

(63) Continuation of application No. 16/602,325, filed on Sep. 13, 2019, now Pat. No. 11,168,769.

(60) Provisional application No. 62/765,807, filed on Sep. 14, 2018.

(51) Int. Cl.
| | |
|---|---|
| *F16H 25/20* | (2006.01) |
| *F16H 25/24* | (2006.01) |
| *F16H 57/00* | (2012.01) |
| *E04H 15/06* | (2006.01) |
| *E04H 15/04* | (2006.01) |

(52) U.S. Cl.
CPC ............ *F16H 25/20* (2013.01); *F16H 25/24* (2013.01); *F16H 57/0006* (2013.01); *E04H 15/04* (2013.01); *E04H 15/06* (2013.01); *F16H 2025/2031* (2013.01); *F16H 2025/2075* (2013.01); *F16H 2025/2087* (2013.01)

(58) Field of Classification Search
CPC ...... F16H 25/20; F16H 25/24; F16H 57/0006; F16H 2025/2031; F16H 2025/2075; F16H 2025/2087
USPC .......................................................... 74/335
See application file for complete search history.

(56) References Cited

U.S. PATENT DOCUMENTS

| | | | |
|---|---|---|---|
| 2,899,938 A | | 8/1959 | Gardner |
| 3,671,786 A | | 6/1972 | Jones |
| 4,211,152 A | | 7/1980 | Colletti et al. |
| 4,906,166 A | | 3/1990 | Seidel |
| 4,927,988 A | | 5/1990 | Nolte |
| 4,955,793 A | | 9/1990 | Caoduro |
| 5,039,284 A | * | 8/1991 | Talaski ................ F04C 15/0053 415/55.1 |

(Continued)

*Primary Examiner* — Ha Dinh Ho
(74) *Attorney, Agent, or Firm* — NIXON & VANDERHYE P.C.

(57) ABSTRACT

A telescopic linear actuator includes a rotational drive mechanism specially adapted and assembled within a tubular housing to reduce noise and vibration of the actuator during its operation. The rotational drive mechanism includes an electric motor adapted for low current operation, a gearbox containing a planetary gear axially connected to the motor with a stepped-up gear ratio, and a drive screw member operatively connected to the gearbox to extend longitudinally through the tubular housing. The drive screw is provided with a specially configured threaded surface formed along the screw member having a reduced thread count and associated increased thread pitch to operatively engage and drive a movable piston member through the tubular housing.

15 Claims, 3 Drawing Sheets

(56) References Cited

U.S. PATENT DOCUMENTS

| | | | |
|---|---|---|---|
| 5,123,474 A | 6/1992 | Smith | |
| 5,263,459 A * | 11/1993 | Talaski | F02M 37/103 137/197 |
| 5,378,121 A | 1/1995 | Hackett | |
| 5,571,001 A | 11/1996 | Fukuda et al. | |
| 5,655,892 A * | 8/1997 | Cherniawski | F02M 37/08 417/292 |
| 5,915,926 A * | 6/1999 | Janik | B01D 35/26 417/313 |
| 6,068,456 A * | 5/2000 | Tuckey | F04D 5/002 417/423.3 |
| 6,129,529 A | 10/2000 | Young et al. | |
| 6,379,127 B1 | 4/2002 | Andrews | |
| 7,207,786 B2 | 4/2007 | Grant | |
| 7,264,494 B2 | 9/2007 | Kennedy et al. | |
| 7,571,691 B2 | 8/2009 | Russikoff | |
| 7,632,124 B2 | 12/2009 | Kennedy et al. | |
| 7,726,997 B2 | 6/2010 | Kennedy et al. | |
| 7,857,604 B2 | 12/2010 | Shaw et al. | |
| 7,895,964 B2 | 3/2011 | Russikoff | |
| 8,651,836 B2 | 2/2014 | Parmeter et al. | |
| 8,698,022 B2 | 4/2014 | Kawakami | |
| 8,857,366 B2 | 10/2014 | Russikoff | |
| 9,000,643 B2 | 4/2015 | Kino | |
| 9,175,692 B2 | 11/2015 | Nowitzki et al. | |
| 9,373,986 B2 | 6/2016 | Quade et al. | |
| 9,945,377 B2 | 4/2018 | Pippes et al. | |
| 10,502,004 B2 | 12/2019 | Knapp et al. | |
| 2004/0146413 A1 * | 7/2004 | Grant | F04C 15/066 210/416.4 |
| 2010/0202896 A1 | 8/2010 | Du | |

\* cited by examiner

DRIVE MECHANISM FOR TELESCOPIC LINEAR ACTUATOR

CROSS-REFERENCE TO RELATED APPLICATION

This application is a continuation of U.S. patent application Ser. No. 16/602,325 filed Sep. 13, 2019, pending, which claims the benefit of U.S. Provisional Patent Application No. 62/765,807 filed Sep. 14, 2018, the entire contents of each of which are hereby incorporated by reference in this application.

BACKGROUND OF THE INVENTION

The present invention relates to rotational drive systems for a telescopic linear actuator used to provide reversible movement of components in opposite longitudinal directions, and more particularly, to an improved motorized drive mechanism for the tubular actuator of a retractable shade system deployed from a building structure, boat or other recreational vehicle that substantially reduces the noise of operation of the actuator without adversely affecting its performance characteristics.

Telescopic linear actuators found powered by electrical, pneumatic or hydraulic means are used in a number of applications to control the movement and specific positioning of a variety of working parts and associated surfaces. Typically comprising a rotational drive mechanism that includes a motor, drive screw and gear coupling fitted together inline within a tubular housing cylinder, these telescopic linear actuators generally allow one or more elements to be moved relative to a fixed element in alternate directions at selected times and to remain stationary in the interim periods.

A current implementation of these telescopic linear actuators is made within retractable canopy systems of the type that employ rotating roller members to automate the deployment of a canvas or other like material as a shade cover in connection with a building, boat or recreational vehicle. In this retractable canopy application, typically a pair of telescopic linear actuators are employed, powered in common and mounted in a parallel framework to extend and retract the canvas shade at the control of the user. While the operational performance of existing designs of these types of telescopic linear actuators has been generally effective in their deployment of retractable canopy systems, their drive mechanisms have come to generate excessive noise and vibration in their operation as the load and length of the retractable canopies being deployed have increased. Because the tubular body of the actuator acts like a pipe organ, echoing any noise down the length of the tube, the longer the tube, the louder the echo from any noise and vibration. Even though the drive mechanism itself may not be noisy, the inline motor is a source of a substantial amount of noise so that when connected together with the ensuing load put on the motor, the motor noise becomes amplified and multiplies with any additional load the actuator is pushing against.

Attempts have been made to reduce noise generation within the tubular actuators by using various levels of commercial and military insulating materials around the motor for noise dampening. Spatial restrictions within the tubular actuators have caused these attempts to be unsuccessful because of the need for thick, multiple layers of sound proofing material, sometimes with air spaces required between the materials for the noise and vibration to dissipate. Coating the internal walls of the tubular body of the actuator was also dismissed due to the internal parts that are required to move along the walls that would interfere with the operation of the actuator and/or wear out any coatings.

A need has therefore been identified for an improved quiet-running telescopic linear actuator with a substantially silent drive particularly useful and effective for deploying retractable canopy systems on boats and other vehicles.

SUMMARY OF THE INVENTION

Accordingly, it is a general purpose and object of the present invention to provide an improved telescopic linear actuator having a rotational drive mechanism more quiet in its operation than those heretofore available for use.

A more particular object of the present invention is to provide an improved rotational drive mechanism for a telescopic linear actuator that minimizes noise and vibration in its operation without adversely affecting the torque produced.

Another object of the present invention is to provide a quiet running telescopic linear actuator of the type having an inline motor and drive that maintains the torque required in its application with reduced noise and vibration produced throughout the length and load thereof.

Still another object of the present invention is to provide an improved inline drive for a motorized telescopic linear actuator that is quiet and efficient and capable of applying a full range of torque to load demands upon the actuator.

A still further object of the present invention is to provide a quiet running inline drive for a motorized telescopic linear actuator that is economical to manufacture, simple to assemble, and easy to install.

Briefly, these and other objects of the present invention are accomplished by an improved telescopic linear actuator comprising a rotational drive mechanism specially adapted and assembled within a tubular housing to reduce noise and vibration of the actuator during its operation. The rotational drive mechanism includes an electric motor adapted for low current operation, a gearbox containing a planetary gear axially connected to the motor with a stepped-up gear ratio, and a drive screw member operatively connected to the gearbox to extend longitudinally through the tubular housing with a specially formed threaded surface configured along the screw member having a reduced thread count and associated increased thread pitch to operatively engage and drive a movable piston member through the tubular housing with a substantially silent glide being exhibited.

For a better understanding of these and other aspects of the present invention, reference should be made to the following detailed description taken in conjunction with the accompanying drawings in which like reference numerals and character designate like parts throughout the figures thereof.

BRIEF DESCRIPTION OF THE DRAWINGS

For a fuller understanding of the nature and objects of the present invention, references in the detailed description set forth below shall be made to the accompanying drawings in which.

DETAILED DESCRIPTION

Figure 1:
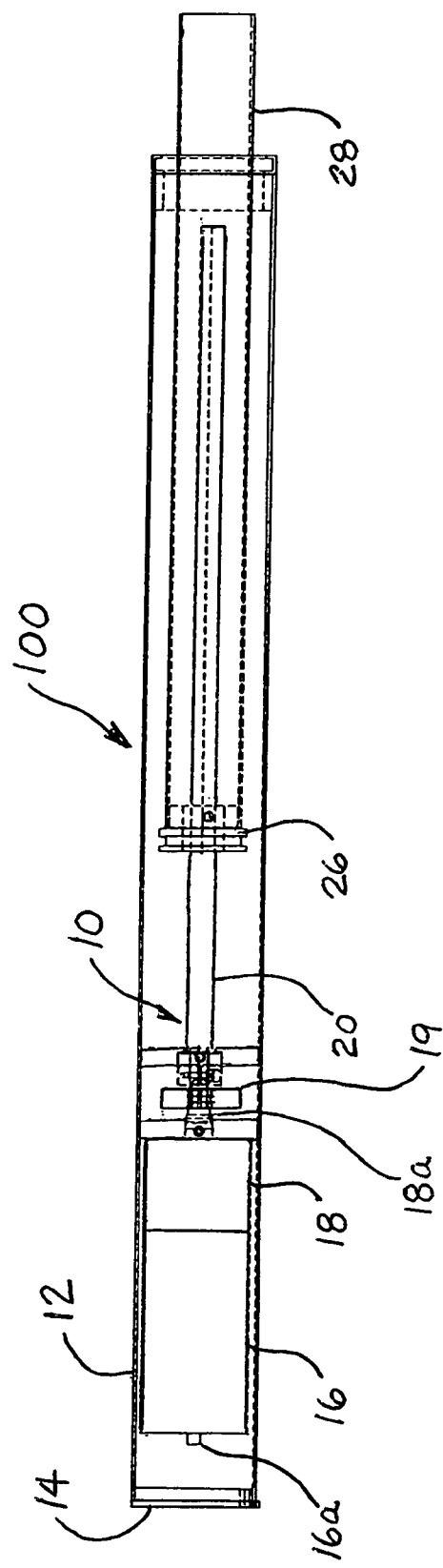
FIG. 1 is a longitudinal plan view of a telescopic linear actuator contained within a tubular housing and incorporating a rotational drive mechanism made in accordance with the present invention, the outer wall of the tubular housing being cutaway to show the present invention.

The following serves to describe a preferred embodiment of the present invention and the best presently contemplated mode of its production and practice. This description is further made for the purpose of illustrating the general principles of the invention but should not be taken in a limiting sense, the scope of the invention being best determined by reference to any associated claims.

Referring to the drawings, the following is a list of structural components of the present rotational drive mechanism, generally designated 10, and those associated structural elements of the telescopic linear actuator 100 of which the present invention is a part:

100 telescopic linear actuator;
 10 rotational drive mechanism;
 12 tubular housing;
 14 end cap;
 16 electric motor;
 16a motor input;
 18 planetary gearbox;
 18a gearbox output shaft;
 19 coupler fitting;
 20 drive screw member;
 22 core diameter;
 24 screw threads;
 26 drive nut;
 28 piston arm.

Referring now to the drawings and initially to FIG. 1, the rotational drive mechanism 10 of the present invention is assembled and disposed inline as a central part of a telescopic linear actuator 100 of the type used in the deployment of a retractable shade system onboard a boat (not shown). Examples of these retractable shade systems employing such telescopic linear actuators 100 are found described in U.S. Pat. Nos. 8,857,366, 7,895,964 and 7,571,691, all of which teachings are incorporated herein by reference. The telescopic linear actuator 100 is generally contained and intended to operate within a tubular housing 12. The tubular housing 12 is open-ended and substantially cylindrical in structural form with one end thereof typically fitted with an end cap 14 and the other end generally left open for passage therethrough of a piston arm 28 that is adapted to operatively engage the rotational drive mechanism 10 and travel thereon in alternate directions through the tubular housing upon the rotational movement of the drive mechanism.

The present rotational drive mechanism 10 is fitted in its assembly for containment within the tubular housing 12 and adapted to be mounted in a stationary position therein along the longitudinal axis of the housing. In accordance with the present invention, the rotational drive mechanism 10 is assembled comprising a direct current (DC) electric motor 16, an associated gearbox 18 containing a planetary gear 18a directly connected to the motor output, and a drive screw member 20 operatively connected to the output of the gearbox and made to extend longitudinally through the tubular housing along its central axis. Powered by a DC voltage source electrically connected to the motor input 16a, the electric motor 16 is reversible in its rotational operation and further adapted to run at regulated input currents below those normally specified for the motor in order to achieve a slower motor speed, measured in revolutions per minute (rpm), than was designed into the motor specifications. This controlled reduction of the motor speeds through regulation of the input currents serves to reduce the motor speeds from the standard recommended 6000 rpm down to below 2000 rpm, more than 60% reduction of the recommended specifications of the motor manufacturer. It should be noted and understood that universal motor manufacturer recommendations and standards that generally govern motorized drive applications, such as here in the present drive mechanism 10, take the approach to have a relatively high motor speed of approximately 6000 rpm and higher in order to ensure the motor along with its associated gearbox will provide the proper output torque especially with smaller size motors. A typical motor and gearbox combination with these speeds in an inline drive actuator with its tubular body and load produces a sound level of 95+ decibels, a high level of ear piercing noise. Smaller, specially-made units, such as motor 16, are available to run at lower speeds according to the manufacturer standards, but found to be limited in their speed reduction to about 3400 rpm or about one-half of the normal motor speed. At this reduced speed, the operating sound level of the motor and gearbox combination came down to 85 decibels but still not enough for an acceptable noise level. Further experimentation found that using the slowest rated motor unit available from the manufacturer (3400 rpm @ 24 v) and altering its configuration to run at about half speed by using a variable power supply, the combination of the reduced motor speed, 1800 rpm more or less, together with a gearbox ratio adjustment, as described below, provided sufficient torque to operate the telescopic linear actuator 100 through its normal cycles and lowered the noise level to 50 decibels, a level sufficiently low at which attendant personnel can barely hear the operation.

Operating at lower amperage levels, the motor 16 will not work as hard as at its normal standard operating capacity and will require less voltage as well. This lower need for power capacity provides opportunity for less draw from stored power onboard the boat or other vehicle. This frees up power capacity for distribution to other equipment such as radio, radar, etc. In addition, the lesser need for voltage to operate the present drive mechanism 10 and associated telescopic actuator 100 will make the actuator more self-sufficient with current electrical demand, reduce down-time interruptions and increase reliability of the associated retractable shade system. Lower operating voltage of the drive mechanism 10 and its motor 16 also provides the opportunity to use solar energy alone to power the telescopic linear actuator 100.

The gearbox 18 containing planetary gear 18a may be a separate unit positioned inline with the motor or as is preferred in the present embodiment, integrally connected to the motor and its output in a combined unit. As is generally the case with motorized drive systems for linear actuators like the present telescopic linear actuator 100, a gearbox of some sort is added inline and combined with the motor to provide the necessary torque needed for driving the application. When a right-angle motor method is applied to a drive, it provides a capability to change the type of gear configuration, such as through a worm gear, which can reduce noise. However, these types of right-angle gearbox configurations are not available to use when implementing an inline motorized drive actuator, which generally avails itself of gearbox system exclusively using an inline planetary gearbox in combination with the drive motor. In the present rotational drive mechanism 10, the planetary gearbox 18 is used to provide the necessary torque for actuator movement. While reducing the speed of the motor 16 supports noise reduction in the telescopic linear actuator 100, it also reduces the torque that the actuator can generate in applying push or pull forces to the associated retractable shade system. The gearbox 18 and more particularly, the gearbox ratio between the motor rotation and that of the drive screw member is therefore stepped-up to a level that increases the torque to adequately push or pull in force the specified retractable load requirements. A related effect also associated with a reduction of the motor speed is an adverse reduction of the torque in relation to the motor's peak performance level of operation, which can make the slower running motor more susceptible to stalling under load. Accordingly, to maintain the output torque of the present drive mechanism 10 needed to satisfy the load requirements as well as to maintain its performance levels, an increase in the gearbox ratio afforded by the planetary gearbox 18 is determined and made in the approximate percentage level as the percentage reduction in the motor speed requirement. In this case, a reduction in the motor speed by 60% would target that the gearbox ratio should be increased by 60%. For instance, if the gear ratio was 19:1, the new gear ratio should be in the area of 38:1. A greater increase in gear ratio is permitted but a reduction of gear ratio within 5-10% lower than the target will cause operation issues to adequately push or pull the previous load requirement.

Figure 2:
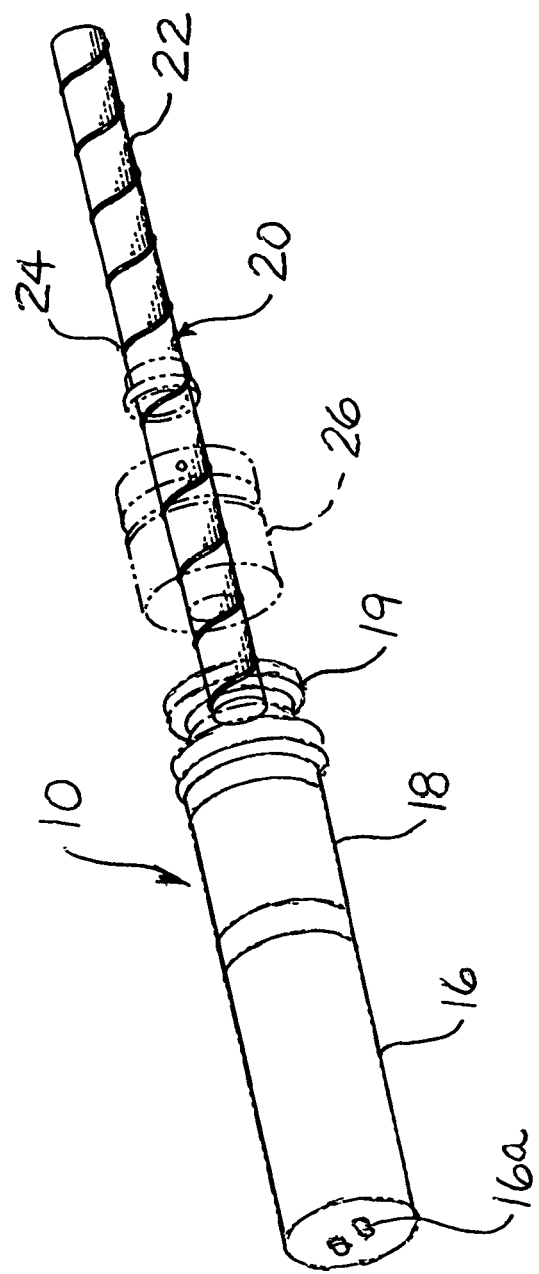
FIG. 2 is a perspective view of the rotational drive mechanism of the present invention shown separate and apart from the tubular housing and the other component elements of the telescopic linear actuator shown in FIG. 1.
Figure 3:
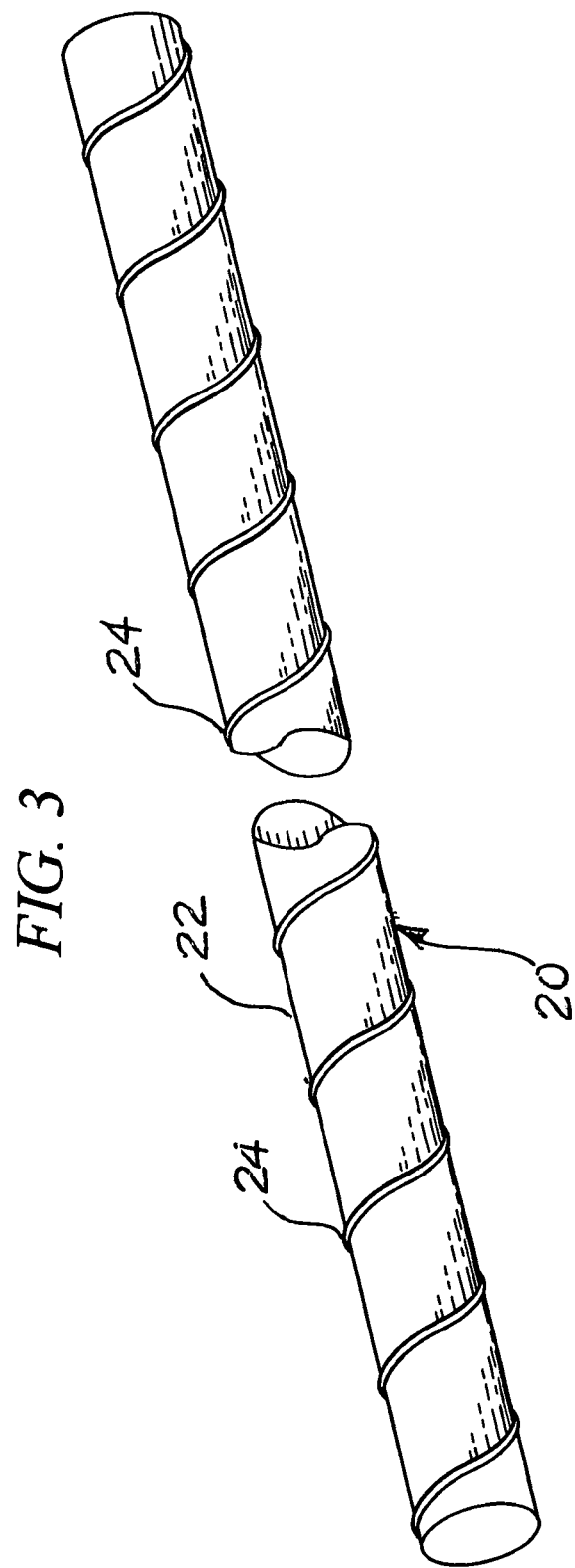
FIG. 3 is a further perspective view of the drive screw member of the present rotational drive mechanism shown in FIG. 2.

Referring now to FIGS. 2 and 3 in conjunction with FIG. 1, the drive screw member 20 is axially secured to the output shaft 18a of the planetary gearbox 18 via a coupler fitting 19 positioned within the tubular housing 12. The drive screw member 20 thus rotates together in unison with the output shaft 18a of the gearbox 18 and extends its axial rotation along the full length of the screw member substantially through to the open end of the tubular housing 12. The outer surface of the drive screw member 20 engages a drive nut 26 attached to the inner end of the piston arm 28 and is formed to provide a pattern of screw threads 24 around a core diameter 22 so that the screw threads in their rotation on the drive screw member will motivate movement of the piston arm through the tubular housing 12. The pitch of the screw threads 24 or the distance between one thread and the next along the drive screw member 20 is expanded and relatively wider than normal, being in the dimensional range of about 1 inch. Customary thread counts on such drive screws usually range about 5 threads per inch (TPI) whereas the pattern of threads formed along the present drive screw member 20 would be 1 TPI. This substantial increase in the pitch of the threads 24 along drive screw member 20 and consequent reduction in the TPI along the surface serves to maintain normal travel speed of the telescopic linear actuator despite the slowed motor speed.

With a screw-driven drive in an actuator, the speed in which the actuator arm moves depends on the thread pitch of the drive screw. For instance, if there are five threads per inch on the drive screw, the motor shaft will have to rotate 5 complete revolutions (360 degrees×5) to move 1" of travel on the drive screw. The time the motor used to take to rotate 5 consecutive revolutions may have been 5 seconds. Now with slowing the motor down 60%, it would now take 8-10 seconds (or twice the time frame) to travel the same distance as previously configured. In order to overcome the travel speed reduction, the drive screw threads need to change to compensate. The old configuration of threads per inch will have to increase by 5 times to equal the same travel speed. So now the threads on the drive screw will equal 1" of travel per one revolution.

This specialized configuration of the present rotational drive mechanism 10 thus provides low noise levels (50 decibels) below general talking levels and lower electrical amperage levels. The achieved quieter linear actuator 100 provides acceptable noise levels for operation especially in circumstances when an associated retractable shade system deployed using the actuator is installed inside the sonic chamber of a hardtop roof of a boat where the cavity of the hardtop holding the actuator would echo the noise of the actuator as well.

Therefore, it is apparent that the described invention provides an improved telescopic linear actuator having an inline drive mechanism that runs quiet in its operation with less noise and vibration than those heretofore available for use. More particularly, the described invention provides an improved rotational drive mechanism for a telescopic linear actuator that minimizes noise and vibration in its operation without adversely affecting the torque produced. The described invention provides a quiet running telescopic linear actuator of the type having an inline motor and drive that maintains the torque required in its functional application with reduced noise and vibration produced throughout the length and load of its application. The disclosed inline rotational drive mechanism for the foregoing telescopic linear actuator runs quietly and efficiently and is capable of applying a full range of torque to load demands upon the actuator in which it is installed. Furthermore, the described inline motor and drive mechanism for telescopic linear actuators is economical to manufacture, simple to assemble, and easy to install.

Obviously, other embodiments and modifications of the present invention will readily come to those of ordinary skill in the art having the benefit of the teachings presented in the foregoing description and drawings. Alternate embodiments of different shapes and sizes, as well as substitution of known materials or those materials which may be developed at a future time to perform the same function as the present described embodiment are therefore considered to be part of the present invention. Furthermore, certain modifications to the described embodiment that serve to benefit its usage are within the scope of the present invention. Accordingly, it is understood that this invention is not limited to the particular embodiment described, but rather is intended to cover modifications within the spirit and scope of the present invention as expressed in the appended claims.

The invention claimed is:

1. A telescopic linear actuator for movement of an article coupled thereto in opposite longitudinal directions with reduced noise levels, comprising:
    a tubular housing substantially cylindrical in form and having a longitudinal axis; and
    a rotational drive assembly contained within the tubular housing, the rotational drive assembly comprising an electric motor reversible in rotational operation, a planetary gearbox connected to the electric motor and having a stepped-up gear ratio to provide increased torque, and a drive screw member engaged with the planetary gearbox.

2. A telescopic linear actuator according to claim 1, further comprising a piston arm connected to the drive screw member of the rotational drive assembly and made to move thereon in alternate directions longitudinally through the tubular housing.

3. A telescopic linear actuator according to claim 1, wherein the electric motor is regulated in the rotational operation thereof to run effectively at reduced motor speeds below normal motor specifications.

4. A telescopic linear actuator according to claim 3, wherein the reduced motor speeds of the electric motor are below 2000 rpm.

5. A telescopic linear actuator according to claim 3, wherein the stepped-up gear ratio of the planetary gearbox is increased to a level inversely proportional to the reduction in the motor speed of the electric motor.

6. A telescopic linear actuator according to claim 1, wherein a thread count along the drive screw member is approximately one thread per inch.

7. A telescopic linear actuator for linear movement of an article coupled thereto in opposite longitudinal directions with reduced noise levels, comprising:
- a tubular housing;
- a rotational drive assembly contained within the tubular housing, the rotational drive assembly including:
  - a reversible electric motor with a motor output,
  - a planetary gearbox connected to the motor output, and
  - a drive screw engaged with the planetary gearbox; and
- a piston arm connected to the drive screw and displaceable by rotation of the drive screw,
- wherein the reversible electric motor is connected to a variable power supply and configured to operate at regulated input currents below those normally specified resulting in a slower motor speed.

8. A telescopic linear actuator according to claim 7, wherein the planetary gearbox is configured such that a ratio between rotation of the reversible motor and rotation of the drive screw is stepped-up.

9. A telescopic linear actuator according to claim 8, wherein the planetary gearbox is configured such that the ratio is stepped-up to a level that increases actual torque output to match a required torque output at normal motor operating speeds.

10. A telescopic linear actuator according to claim 8, wherein the ratio is stepped-up to a level inversely proportional to a percentage reduction in the motor speed.

11. A telescopic linear actuator according to claim 7, wherein the slower motor speed of the reversible electric motor is below 2000 rpm.

12. A telescopic linear actuator according to claim 7, wherein a thread count along the drive screw is approximately one thread per inch.

13. A method of operating a telescopic linear actuator including a tubular housing and a rotational drive assembly contained within the tubular housing, wherein the rotation drive assembly includes a reversible electric motor with a motor output, a planetary gearbox connected to the motor output, and a drive screw engaged with the planetary gearbox, the method comprising:
- connecting the reversible electric motor to a variable power source; and
- operating the reversible electric motor at regulated input currents below those normally specified resulting in a slower motor speed.

14. A method according to claim 13, further comprising stepping up a gear ratio of the planetary gearbox to provide increased torque.

15. A method according to claim 14, wherein the step of stepping up the gear ratio comprises stepping up the gear ratio by an amount inversely proportional to a percentage reduction in the motor speed.

* * * * *